United States Patent [19]
Sexton et al.

[11] Patent Number: 5,937,333
[45] Date of Patent: Aug. 10, 1999

[54] METHOD AND APPARATUS FOR ADJUSTING INBOUND TRANSMISSION RELIABILITY IN A TWO-WAY MESSAGING SYSTEM

[75] Inventors: Thomas Aloysius Sexton, Haltom City; Thomas Casey Hill, Trophy Club; Robert Louis Breeden, Colleyville, all of Tex.

[73] Assignee: Motorola, Inc., Schaumburg, Ill.

[21] Appl. No.: 08/864,034

[22] Filed: May 27, 1997

[51] Int. Cl.[6] .............................. H04Q 7/30; H04Q 7/10
[52] U.S. Cl. ........................... 455/73; 455/561; 455/562; 455/524
[58] Field of Search .................................. 455/447, 434, 455/561, 562, 524, 517, 25, 63, 73

[56] References Cited

U.S. PATENT DOCUMENTS

| | | | |
|---|---|---|---|
| 4,144,496 | 3/1979 | Cunninham et al. | 325/53 |
| 5,410,752 | 4/1995 | Scholefield | 455/33.1 |
| 5,710,976 | 1/1998 | Hill et al. | 455/56.1 |
| 5,711,007 | 1/1998 | Lin et al. | 455/447 |

OTHER PUBLICATIONS

Barrett and Arnot, "Adaptive Antennas for Mobile Communications," *Electronics & Communication Engineering Journal*, pp. 203–214, Aug. 1994, USA.

*Primary Examiner*—Wellington Chin
*Assistant Examiner*—Sheila Smith
*Attorney, Agent, or Firm*—R. Louis Breeden

[57] ABSTRACT

A fixed portion (102) of a radio messaging system schedules (602) an inbound message to be transmitted at a first scheduled time on a channel from a portable subscriber unit (122). The channel is monitored (604) at the first scheduled time to receive the inbound message, utilizing a beamforming technique. In response to failing to achieve adequate reception of the inbound message at the first scheduled time, the fixed portion reschedules (608) the inbound message to be transmitted at a second scheduled time, and remonitors (610) the channel at the second scheduled time to receive the inbound message, utilizing an omnidirectional technique.

16 Claims, 5 Drawing Sheets

METHOD AND APPARATUS FOR ADJUSTING INBOUND TRANSMISSION RELIABILITY IN A TWO-WAY MESSAGING SYSTEM

FIELD OF THE INVENTION

This invention relates in general to radio communication systems, and more specifically to a method and apparatus for adjusting inbound transmission reliability in a two-way messaging system.

BACKGROUND OF THE INVENTION

Modern two-way radio messaging systems have begun to utilize antenna beamforming techniques to improve inbound reception sensitivity and to increase capacity under certain conditions. These techniques have allowed inbound transmissions to occur on the same time/frequency channel at smaller geographic separations than possible with omnidirectional receiver antenna patterns. However, the ability of the beamformer processor to optimize the beam direction for a transmission from a portable subscriber unit requires that the portable subscriber unit not be moving too fast relative to the beamforming antenna.

At times, the portable subscriber unit may be moving at highway speeds. Under this condition the portable subscriber unit can experience difficulty with inbound communications in systems designed for time/frequency reuse with beamforming based on a static assumption. Message loss can occur, because the beamforming processor cannot track the rapid phase changes that result from the movement.

Thus, what is needed is a method and apparatus that provides the advantages of beamforming techniques for improving inbound sensitivity and increased capacity, while also providing an ability to adapt itself to subscriber units moving rapidly with respect to the beamforming antenna. Preferably, the method and apparatus will be operable with existing two-way subscriber units in the field.

SUMMARY OF THE INVENTION

An aspect of the present invention is a method of adjusting inbound transmission reliability in a two-way radio messaging system employing a time/frequency reuse distance among a plurality of portable subscriber units. The method comprises the steps of scheduling, by a fixed portion of the radio messaging system, an inbound message to be transmitted at a first scheduled time on a channel from a portable subscriber unit; and monitoring the channel, by the fixed portion, at the first scheduled time to receive the inbound message, utilizing a beamforming technique. In response to failing to achieve adequate reception of the inbound message at the first scheduled time, the method further comprises the steps of rescheduling, by the fixed portion of the radio messaging system, the inbound message to be transmitted at a second scheduled time; and remonitoring the channel, by the fixed portion, at the second scheduled time to receive the inbound message, utilizing an omnidirectional technique.

Another aspect of the present invention is a fixed portion of a two-way radio messaging system for adjusting inbound transmission reliability, the radio messaging system employing a time/frequency reuse distance among a plurality of portable subscriber units. The fixed portion comprises a controller for controlling at least one transmitter and at least one receiver, and the at least one transmitter coupled to the controller for control thereby. The fixed portion further comprises the at least one receiver coupled to the controller for monitoring an inbound message from a portable subscriber unit; and at least one antenna coupled to the at least one receiver, the at least one antenna providing reception utilizing both a beamforming technique and an omnidirectional technique. The controller is programmed to cooperate with the at least one transmitter, the at least one receiver, and the at least one antenna to schedule the inbound message to be transmitted at a first scheduled time on a channel from the portable subscriber unit. The controller is further programmed to monitor the channel at the first scheduled time to receive the inbound message, utilizing the beamforming technique; and to reschedule the inbound message to be transmitted at a second scheduled time, in response to failing to achieve adequate reception of the inbound message at the first scheduled time. The controller is also programmed to remonitor the channel at the second scheduled time to receive the inbound message, utilizing the omnidirectional technique.

Another aspect of the present invention is a controller in a two-way radio messaging system for adjusting inbound transmission reliability, the radio messaging system employing a time/frequency reuse distance among a plurality of portable subscriber units. The radio messaging system has at least one transmitter coupled to the controller for transmitting an outbound message, at least one receiver coupled to the controller for receiving an inbound message from a portable subscriber unit, and at least one antenna coupled to the at least one receiver for providing reception utilizing both a beamforming technique and an omnidirectional technique. The controller comprises a processing system for directing operation of the controller, and a network interface coupled to the processing system for receiving a message from a message source. The controller further comprises a memory coupled to the processing system for storing the message and for storing software used in programming the processing system, and a transceiver interface coupled to the at least one transmitter and to the at least one receiver for control thereof and communication therewith. The processing system is programmed to cooperate with the at least one transmitter, the at least one receiver, and the at least one antenna to schedule the inbound message to be transmitted at a first scheduled time on a channel from the portable subscriber unit. The processing system is further programmed to monitor the channel at the first scheduled time to receive the inbound message, utilizing the beamforming technique; and to reschedule the inbound message to be transmitted at a second scheduled time, in response to failing to achieve adequate reception of the inbound message at the first scheduled time. The processing system is also programmed to remonitor the channel at the second scheduled time to receive the inbound message, utilizing the omnidirectional technique.

DETAILED DESCRIPTION OF THE DRAWINGS

Figure 1:
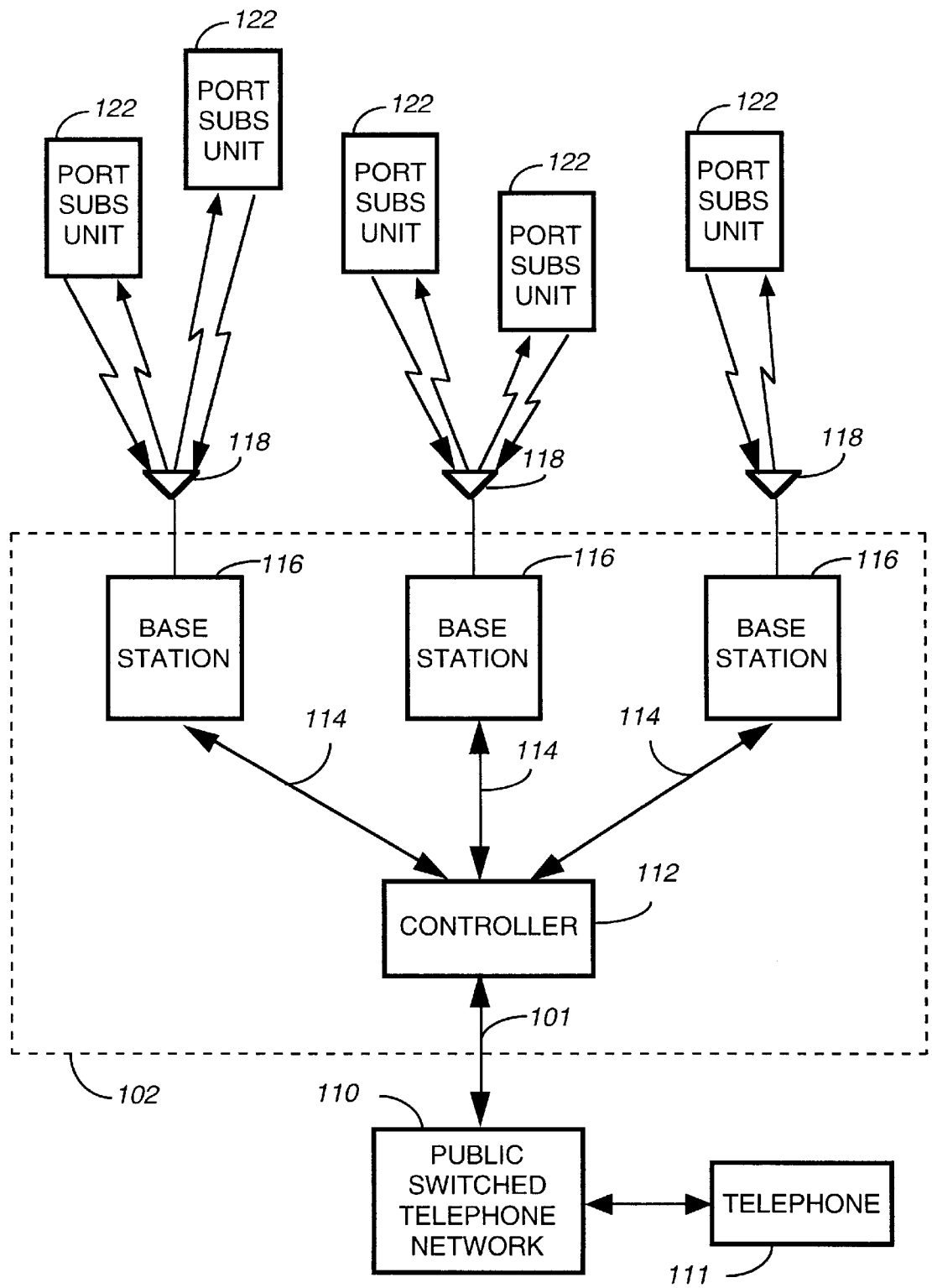
FIG. 1 is an electrical block diagram of a two-way radio messaging system in accordance with the present invention.

Referring to FIG. 1, an electrical block diagram of a radio communication system in accordance with the present invention comprises a fixed portion 102 including a controller 112 and a plurality of base stations 116, and a portable portion including a plurality of portable subscriber units 122, preferably having acknowledge-back capability. The base stations 116 are used for communicating with the portable subscriber units 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized as well for the controller 112 and the base stations 116.

Each of the base stations 116 transmits RF signals to the portable subscriber units 122 via a transceiver antenna 118. The base stations 116 each receive RF signals from the plurality of portable subscriber units 122 via the transceiver antenna 118. The RF signals transmitted by the base stations 116 to the portable subscriber units 122 (outbound messages) comprise selective call addresses identifying the portable subscriber units 122, and data or voice messages originated by a caller, as well as commands originated by the controller 112 for adjusting operating parameters of the radio communication system. The RF signals transmitted by the portable subscriber units 122 to the base stations 116 (inbound messages) comprise responses that include scheduled messages, such as positive acknowledgments (ACKs) and negative acknowledgments (NAKs), and unscheduled messages, such as registration requests. An embodiment of an acknowledge-back messaging system is described in U.S. Pat. No. 4,875,038 issued Oct. 17, 1989 to Siwiak et al., which is hereby incorporated herein by reference.

The controller 112 preferably is coupled by telephone links 101 to a public switched telephone network (PSTN) 110 for receiving selective call message originations therefrom. Selective call originations comprising voice and data messages from the PSTN 110 can be generated, for example, from a conventional telephone 111 coupled to the PSTN 110. It will be appreciated that, alternatively, other types of communication networks, e.g., packet switched networks and local area networks, can be utilized as well for transporting originated messages to the controller 112.

The protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous in any one code word. It will be appreciated that other suitable two-way protocols can be used as well.

Figure 2:
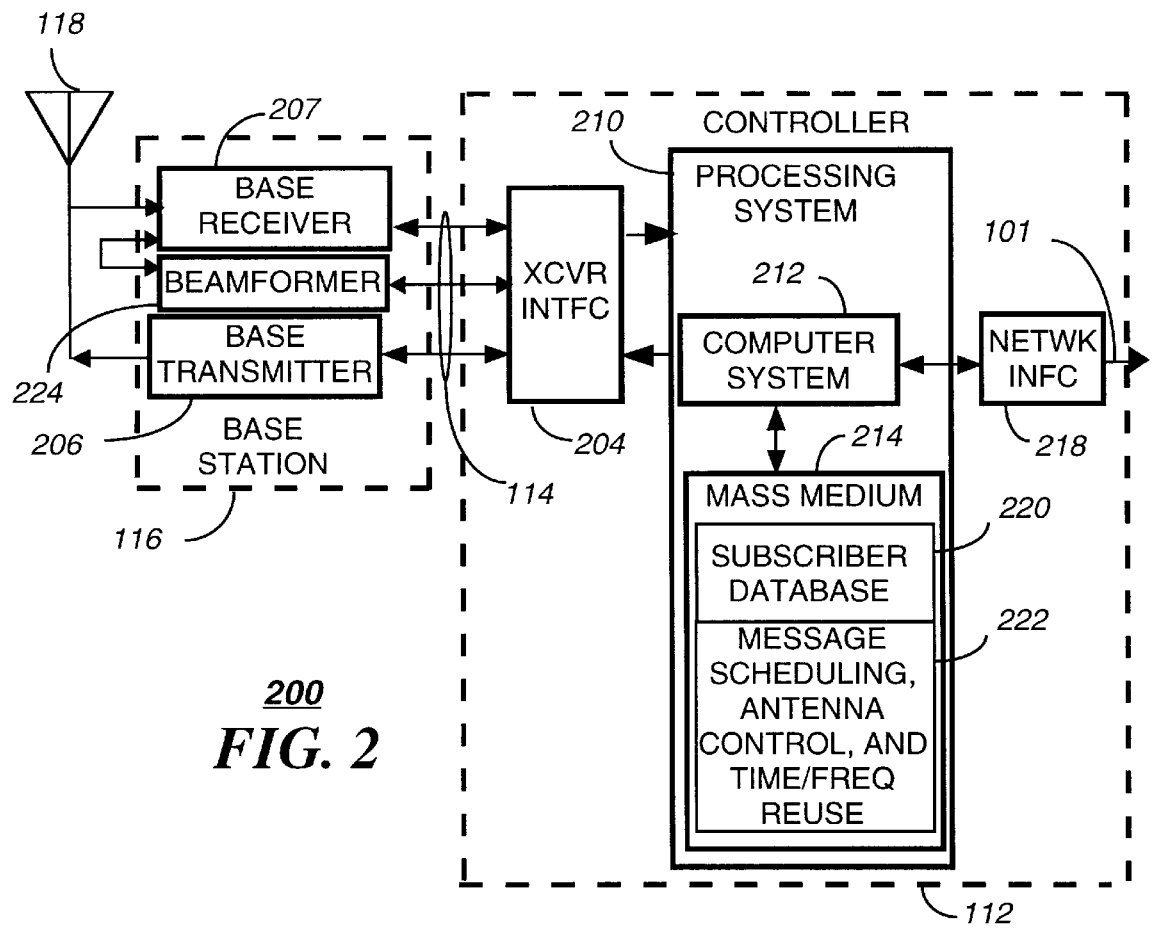
FIG. 2 is an electrical block diagram of a fixed portion of the two-way radio messaging system in accordance with the present invention.

FIG. 2 is a simplified electrical block diagram 200 of portions of the controller 112 and the base station 116 in accordance with the present invention. The controller 112 includes a processing system 210, a conventional transceiver interface 204, and a conventional network interface 218. The base station 116 includes a base transmitter 206 and at least one base receiver 207. The transceiver antenna 118 is preferably a multi-element beamforming antenna. Such an antenna can be constructed from, for example, three conventional omnidirectional antennas positioned one-half wavelength apart in a circular pattern. The base station 116 includes a beamformer 224 coupled to the base receiver 207 for combining sampled signals from different elements of the beamforming antenna using well-known digital signal processing techniques to control the directional sensitivity of the beamforming antenna and obtain a maximum signal-to-interference ratio. In accordance with the present invention, a selection is made by the processing system 210, the selection being between a directional, beamforming reception technique and an omnidirectional reception technique, or both, wherein the selection is based upon certain operational criteria as described further below. Preferably the beamformer 224 utilizes a conventional digital signal processor (DSP) similar to the model DSP56800 digital signal processor manufactured by Motorola, Inc. of Schaumburg, Ill. It will be appreciated that, alternatively, other similar DSPs can be utilized in the beamformer 224. Preferably, the DSP of the beamformer 224 is programmed using well-known techniques to control the directional sensitivity of the transceiver antenna 118 in cooperation with the controller 112. It will also be appreciated that, alternatively, other directional receiving techniques, such as an array of directional antennas coupled to an electronic antenna selector switch can be utilized as well to produce a controllable, directional reception.

The processing system 210 is used for directing operations of the controller 112. The processing system 210 preferably is coupled through the transceiver interface 204 to the base transmitter 206 via the communication link 114. The processing system 210 preferably also is coupled through the transceiver interface 204 to the base receiver 207 and to the beamformer 224 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the network interface 218 for accepting outbound messages originated by callers communicating via the PSTN 110 through the telephone links 101.

In order to perform the functions necessary for controlling operations of the controller 112 and the base stations 116, the processing system 210 preferably includes a conventional computer system 212, and a conventional mass storage medium 214. The conventional mass storage medium 214 includes, for example, a subscriber database 220, comprising subscriber user information such as addressing and programming options of the portable subscriber units 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable subscriber units 122, and protocol processing of messages destined for the portable subscriber units 122. The conventional mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207.

The mass medium 214 preferably includes software and various databases utilized in accordance with the present invention. In particular, the mass medium 214 includes a message scheduling, antenna control, and time/frequency reuse element 222 which programs the processing system 210 to perform in accordance with the present invention, as will be described further below. It will be appreciated that the controller 112 and the base station 116 can be either collocated or remote from one another, depending upon system size and architecture. It will be further appreciated that in large systems functional elements of the controller 112 can be distributed among a plurality of networked controllers. For example, the message scheduling, antenna control, and time/frequency reuse element 222 can be located in one or more output controllers located near the base stations 116, while the subscriber database 220 can be kept in a controller at a central location.

Figure 3:
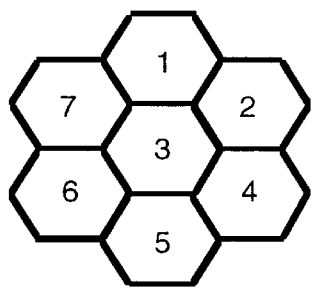
FIGS. 3 and 4 are time/frequency reuse diagrams in accordance with the present invention.
Figure 4:
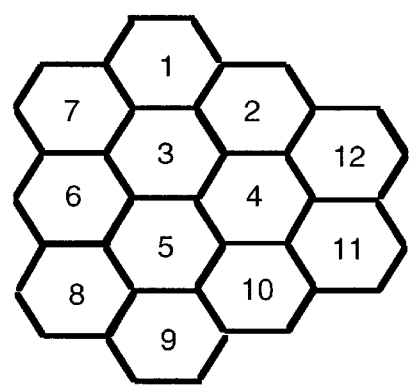

FIGS. 3, and 4 are examples of a two-way messaging system having a plurality of cells employing time/frequency reuse patterns. FIG. 3 illustrates a time/frequency reuse pattern with a seven-cell cluster. If, for example, the two-way messaging system has twenty-one communication frequencies and all time slots are utilized by each cell, then each cell would utilize three unique frequencies. Conversely, another system could utilize, for example, a single frequency and seven non-overlapping time slots, each of the seven time slots being uniquely assigned to each of the seven cells. Other combinations are possible, so long as each cell communicates on either a different frequency or a different time slot from that used by any other cell. As the seven-cell clusters are repeated throughout the communication system, each cell receives several sources of communication interference.

These sources include co-frequency (or co-channel) interference, and adjacent channel interference. Co-channel interference is caused by multiple cells outside of the seven-cell cluster utilizing the same communication frequency. The communication system is designed to place cells utilizing the same communication time/frequency as far apart as allowed by the time/frequency reuse pattern. Adjacent channel interference occurs from communication frequencies that are adjacent to each other in the frequency spectrum. The final form of interference always present in the two-way messaging system is noise inherent in the base transmitters 206, the base receivers 207, and the portable subscriber units 122.

Co-channel and adjacent channel interference can be reduced by changing the time/frequency reuse pattern to increase the time/frequency reuse distance. For example, FIG. 4 illustrates a time/frequency reuse pattern including twelve-cell clusters. In a two-way messaging system utilizing twenty-one communication frequencies, each cell could simultaneously use an average of 1.75 frequencies. The change in the time/frequency reuse pattern reduces the system capacity by approximately 42 percent. However, the distance between cells simultaneously utilizing the same communication frequencies has been increased, thereby reducing co-channel interference. In addition, since there are fewer frequencies present within each cell, adjacent channel interference is reduced. By increasing the time/frequency reuse distance, the coverage range of the transmitters and receivers in each cell is increased. Of particular importance to the present invention, by increasing the time/frequency reuse distance for inbound messages, the range of the base receiver 207 is increased.

Figure 5:
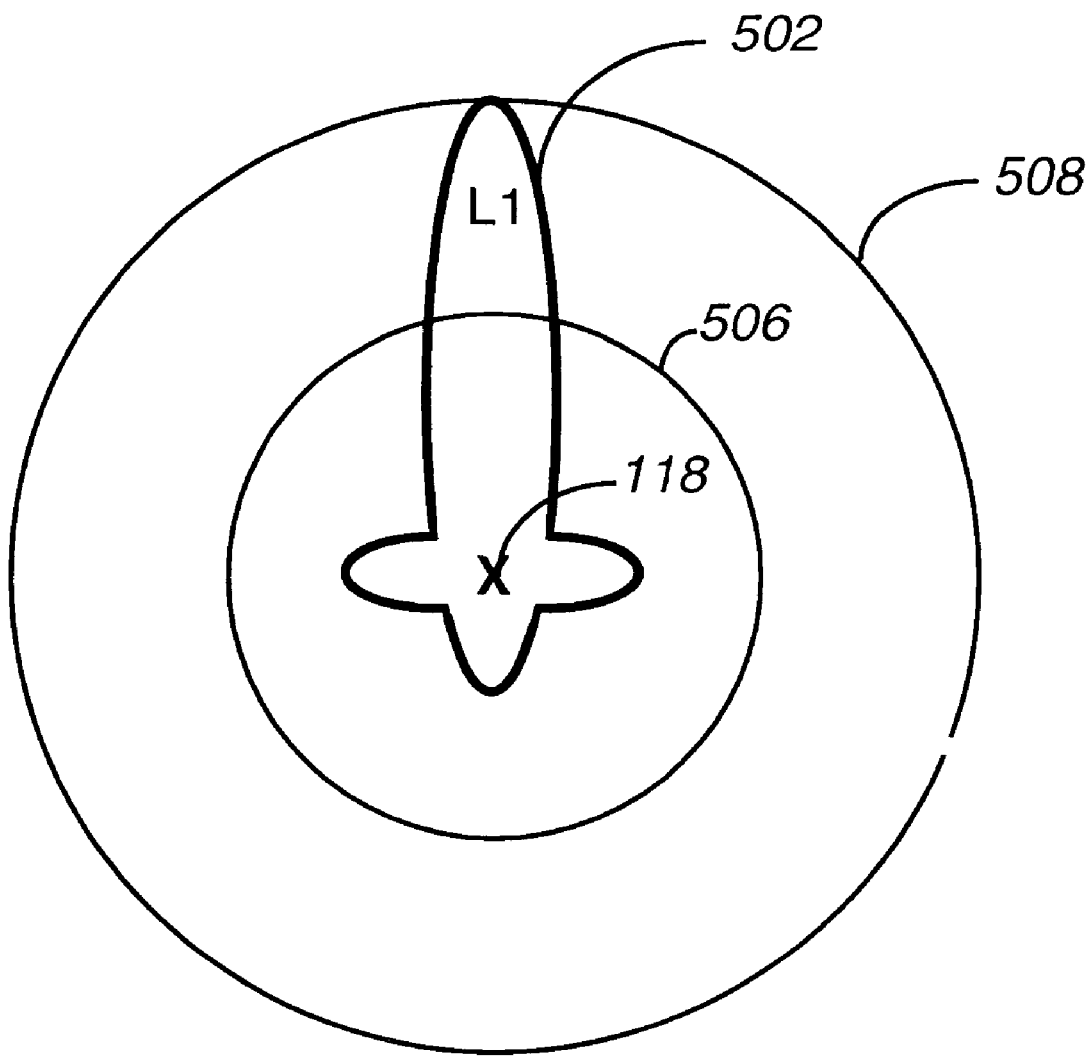
FIG. 5 is a coverage diagram depicting radio coverage utilizing beamforming and omnidirectional techniques in accordance with the present invention.

FIG. 5 is a coverage diagram 500 depicting radio coverage utilizing beamforming and omnidirectional techniques in accordance with the present invention. The antenna 118 having both beamformed and omnidirectional reception capability is located at the "X". By way of example, for the time/frequency reuse distance ordinarily employed by the system the omnidirectional coverage area for adequate inbound reception is the area depicted within the inner ring 506. To provide increased coverage for scheduled inbound messages originating from outside the inner ring 506, the system preferably utilizes a beamforming technique, as depicted by the directional lobes 502 indicating a modified coverage area after beamforming. Preferably, the beamforming technique also is adjusted to reduce interfering signals arriving from directions other than the desired direction. The beamforming technique works for a stationary portable subscriber unit 122 located at position L1, for example, having stationary interfering signals arriving from other directions. However, for a rapidly moving portable subscriber unit 122 or for a rapidly moving interfering signal, the beamforming technique fails, because the phase of the received signals changes too rapidly for the beamformer 224 to track.

A technique that will work for the moving portable subscriber unit 122 or moving interferers is to increase the time/frequency reuse distance of the system, change to an omnidirectional reception pattern, and reschedule the inbound message. By increasing the time/frequency reuse distance, the omnidirectional coverage area is expanded, because the interference is reduced. The omnidirectional coverage area is expanded, for example, to the area depicted within the outer ring 508, thereby advantageously providing a higher probability of adequate inbound reception for the location L1 without the need for beamforming. The price of increasing the time/frequency reuse distance is, of course, decreased system capacity. Thus, in accordance with the present invention, the system preferably utilizes the beamforming technique first, and then utilizes the omnidirectional technique in response to a failure of the beamforming technique to produce adequate reception of a scheduled inbound message.

Unscheduled inbound messages present a more difficult problem, because the system cannot predict exactly when an unscheduled inbound message will occur, and thus may not recognize that the message was transmitted but not received. The system is, however, aware of a range of time slots during which unscheduled messages are transmitted by using well-known ALOHA techniques. During this range of ALOHA time slots the system preferably monitors the inbound channel by using both the beamforming technique and the omnidirectional technique concurrently, but without increasing the time/frequency reuse distance initially. A partially received unscheduled inbound message generally is detectable and the time/frequency reuse distance for a retry of the unscheduled inbound message is increased in response to the partially received unscheduled inbound message. The system can increase the time/frequency reuse distance for unscheduled messages by (a) commanding the portable subscriber units 122 to suppress subzone registration, (b) changing a time/frequency reuse plan for unscheduled inbound messages, (c) assigning more time slots for unscheduled inbound message transmission, and (d) commanding the plurality of portable subscriber units to wait longer between unscheduled inbound message retries, or any combination of (a), (b), (c), and (d). Motorola's ReFLEX™ protocol has commands suitable for implementing (a), (c), and (d). Implementing (b) requires some protocol and subscriber unit changes for deriving the inbound frequency from, for example, the transmitter color code. The preferred way of increasing the time/frequency reuse distance for unscheduled messages is (c)—if traffic permits.

Figure 6:
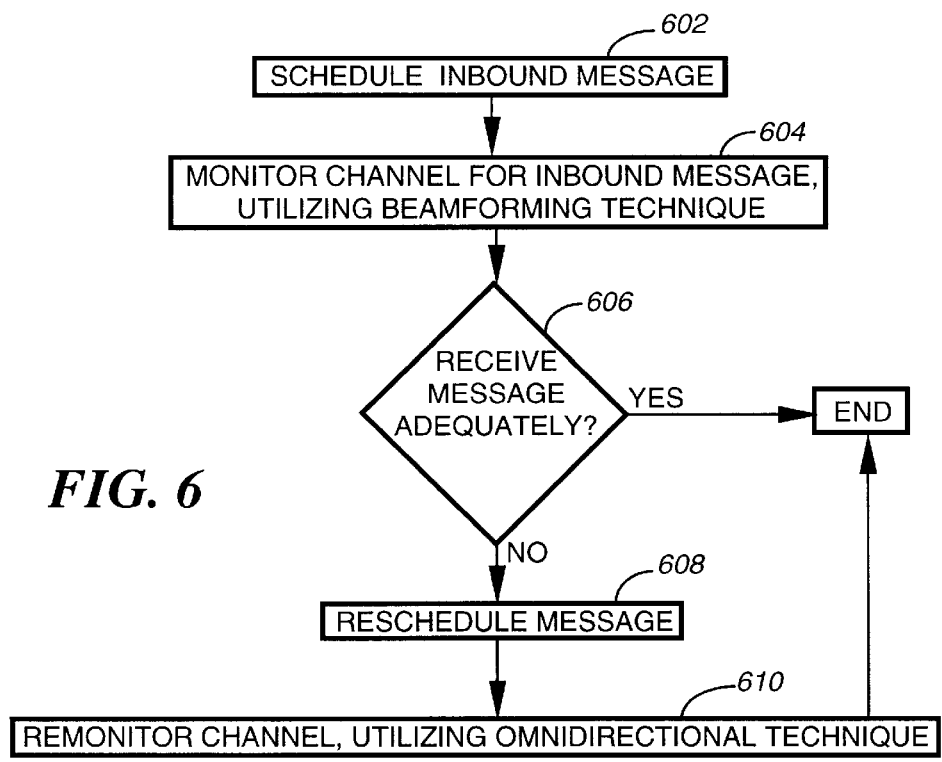
FIG. 6 is a flow chart depicting operation of the fixed portion of the radio messaging system in accordance with the present invention with regard to scheduled messages.

FIG. 6 is a flow chart depicting operation of the fixed portion of the radio messaging system in accordance with the present invention with regard to scheduled messages. The flow begins when the controller 112 schedules 602 an inbound message to be transmitted at a first scheduled time on a channel from the portable subscriber unit 122. Preferably, the message is scheduled through well-known procedures and commands of the outbound protocol. Preferably, the controller 112, the beamformer 224, and the base receiver 207 then cooperate to monitor the channel at the first scheduled time to receive the inbound message, utilizing the beamforming technique. Alternatively, the controller 112 and the base receiver 207 can monitor the channel utilizing both the beamforming technique and the omnidirectional technique concurrently. The controller 112 then checks 606 whether the inbound message was received adequately, e.g., received with no uncorrectable errors. If so, the process ends. If not, the controller 112 reschedules 608 the inbound message to be transmitted at a second scheduled time. The controller 112 and the base receiver 207 then cooperate to remonitor 610 the channel at the second scheduled time to receive the inbound message, utilizing the omnidirectional technique. As part of the rescheduling of the inbound message, the controller 112 preferably increases the time/frequency reuse distance during the second scheduled time. As discussed above, this is done to increase the omnidirectional coverage area available for remonitoring the channel.

Figure 7:
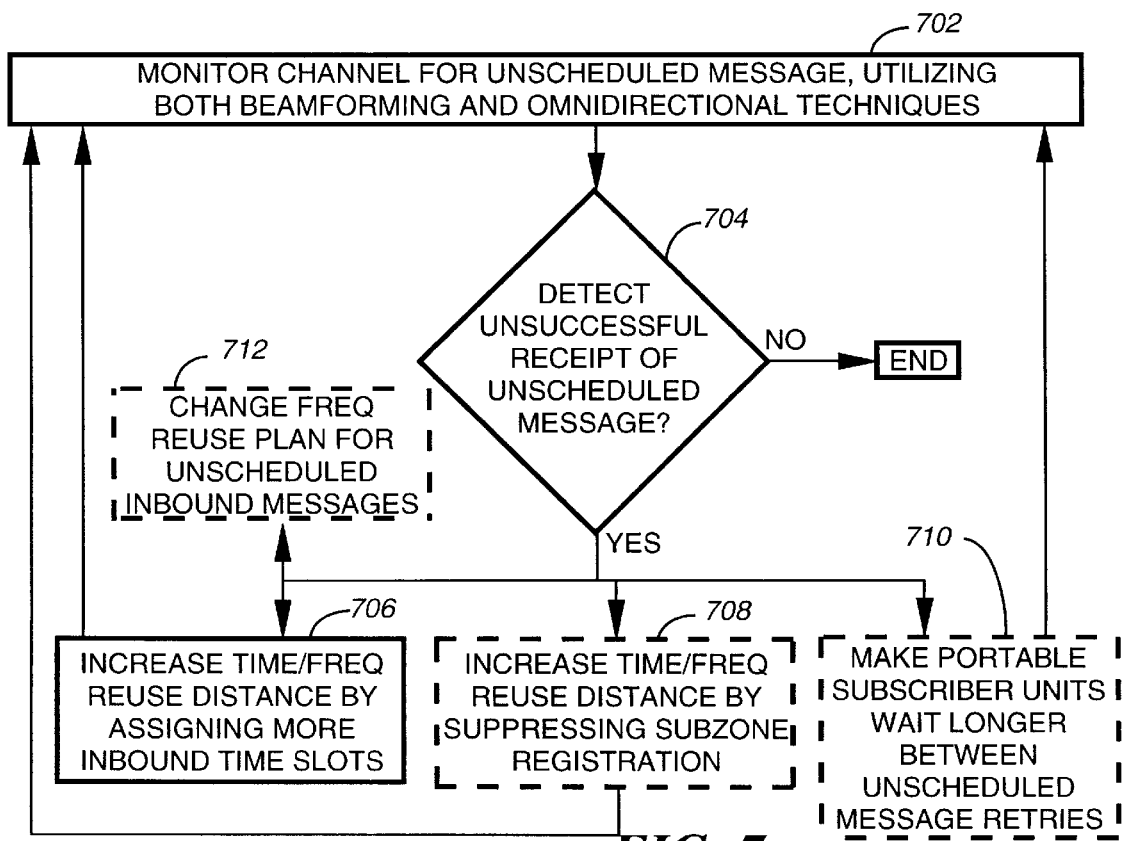
FIG. 7 is a flow chart depicting operation of the fixed portion of the radio messaging system in accordance with the present invention with regard to unscheduled messages.

FIG. 7 is a flow chart depicting operation of the fixed portion of the radio messaging system in accordance with the present invention with regard to unscheduled messages. The flow begins with the controller 112, the beamformer 224, and the base receiver 207 cooperating to monitor 702 the channel during a predetermined time assigned for unscheduled message transmissions. Preferably, both beamforming techniques and omnidirectional techniques are utilized concurrently to maximize the probability of receiving the unscheduled messages. The controller 112 then checks 704 whether during the step of monitoring for unscheduled messages an unscheduled message was detected but unsuccessfully received. This can occur, for example, when a data signal operating at the correct bit rate is detected on the channel, but decodes with too many errors to be usable. If no such unsuccessfully received unscheduled messages have been detected, the process ends. If, on the other hand, an unscheduled message was detected but unsuccessfully received, then the controller 112 preferably increases 706 the time/frequency reuse distance by assigning more inbound time slots for unscheduled messages. Alternatively, the controller 112 can increase 708 the time/frequency reuse distance by commanding the subscriber units 122 to suppress subzone registration requests. As a further alternative, the controller 112 can also command 710 the subscriber units 122 to wait longer between retries of unscheduled messages. Commands for the above three ways of increasing the time/frequency reuse distance exist today in the FLEX family of protocols. Yet another alternative is for the controller 112 to change 712 the frequency reuse plan for unscheduled messages. This alternative would require a new command and a subscriber unit modification. After receiving the new command, the subscriber units would, for example, change from a single transmission frequency used everywhere for unscheduled messages, to a seven-cell frequency reuse pattern. The subscriber units 122 preferably would select which inbound frequency to use based on a portion of a received transmitter color code for the cell in which the subscriber unit 122 is positioned.

Figure 8:
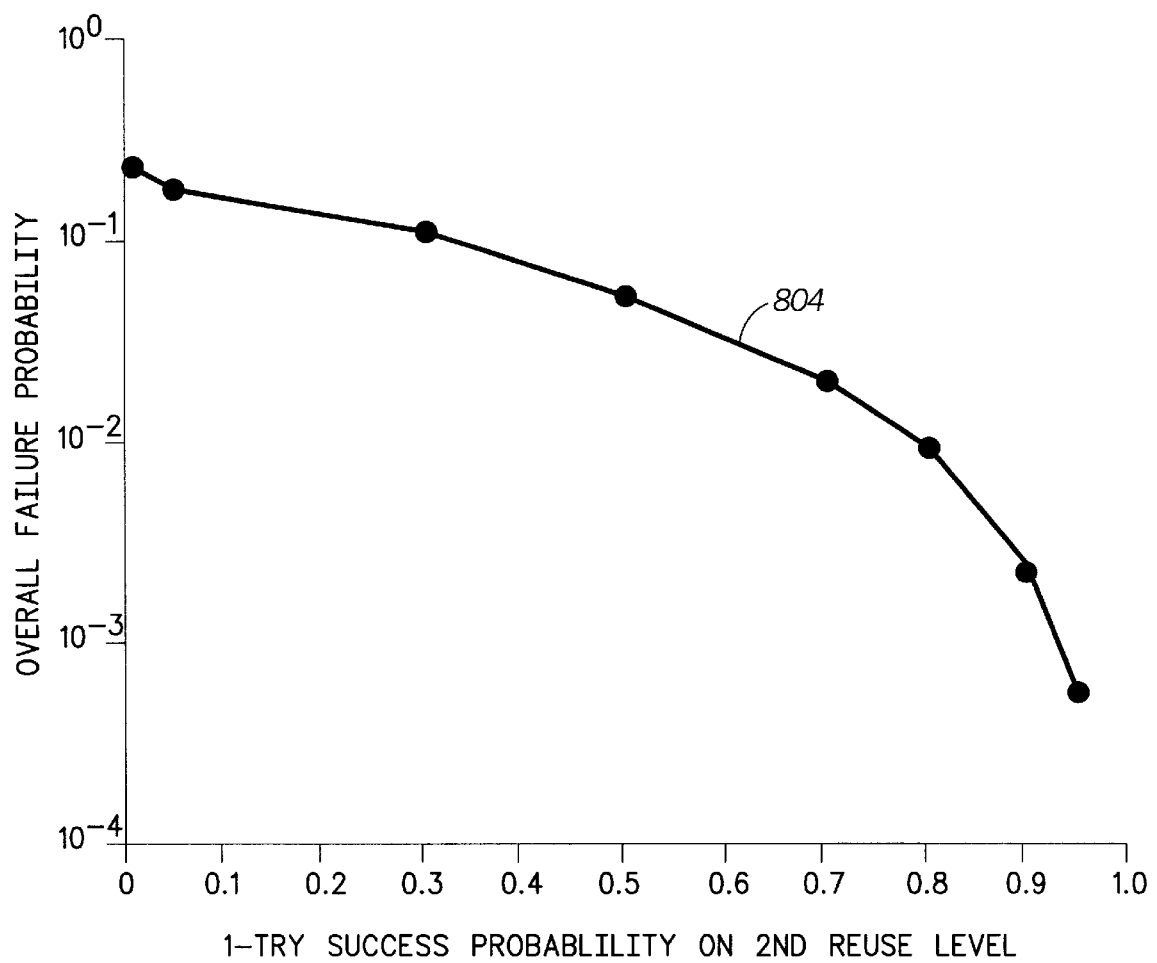
FIG. 8 is a performance diagram depicting performance in accordance with the present invention.

FIG. 8 is a performance diagram 804 depicting performance in accordance with the present invention. The performance diagram 804 was computed using a Marcov chain model. The vertical axis depicts overall failure probability, given the assumption that two attempts are made to send an inbound message using the beamforming technique when the probability of success is, for example, 0.5; and one additional attempt is made using the omnidirectional technique with a higher time/frequency reuse distance. The omnidirectional approach has a success probability depicted on the horizontal axis. If one assumes that the omnidirectional approach has a success probability of 0.8, for example, then the performance diagram 804 indicates that the overall probability of failure using the three tries is about 0.01.

Thus, it should be clear from the preceding disclosure that the present invention is a method and apparatus that provides the advantages of beamforming techniques for improving inbound sensitivity and increased capacity, while also providing an ability to adapt itself to subscriber units moving rapidly with respect to the beamforming antenna. The preferred embodiment of the present invention advantageously is operable with existing two-way subscriber units in the field.

Many modifications and variations of the present invention are possible in light of the above teachings. Thus, it is to be understood that, within the scope of the appended claims, the invention may be practiced other than as described herein above.

What is claimed is:

1. A method of adjusting inbound transmission reliability in a two-way radio messaging system employing a time/frequency reuse distance among a plurality of portable subscriber units, the method comprising the steps of:

scheduling, by a fixed portion of the radio messaging system, an inbound message to be transmitted at a first scheduled time on a channel from a portable subscriber unit; and monitoring the channel, by the fixed portion, at the first scheduled time to receive the inbound message, utilizing a beamforming technique, wherein, in response to failing to achieve adequate reception of the inbound message at the first scheduled time, the method further comprises the steps of:

rescheduling, by the fixed portion of the radio messaging system, the inbound message to be transmitted at a second scheduled time;

increasing, by the fixed portion, the time/frequency reuse distance during the second scheduled time; and remonitoring the channel, by the fixed portion, at the second scheduled time to receive the inbound message, utilizing an omnidirectional technique.

2. The method of claim 1, wherein the monitoring step comprises the step of monitoring the channel, by the fixed portion, at the first scheduled time to receive the inbound message, utilizing both the beamforming technique and the omnidirectional technique.

3. The method of claim 1, further comprising the step of monitoring the channel, by the fixed portion, at a predetermined time to receive an unscheduled inbound message, utilizing both the beamforming technique and the omnidirectional technique.

4. The method of claim 1, further comprising the step of increasing, by the fixed portion, the time/frequency reuse distance for unscheduled inbound messages, in response to detecting an attempt by one of the plurality of portable subscriber units to transmit at least one unscheduled inbound message and failing to achieve adequate reception thereof.

5. The method of claim 4, wherein to increase the time/frequency reuse distance the rescheduling step comprises at least one of the steps of:
   commanding the plurality of portable subscriber units to suppress subzone registration;
   changing a frequency reuse plan for unscheduled inbound messages;
   assigning more time slots for unscheduled inbound message transmission; and
   commanding the plurality of portable subscriber units to wait longer between unscheduled inbound message retries.

6. A fixed portion of a two-way radio messaging system for adjusting inbound transmission reliability, the radio messaging system employing a time/frequency reuse distance among a plurality of portable subscriber units, the fixed portion comprising:
   a controller for controlling at least one transmitter and at least one receiver;
   the at least one transmitter coupled to the controller for control thereby;
   the at least one receiver coupled to the controller for monitoring an inbound message from a portable subscriber unit; and
   at least one antenna coupled to the at least one receiver, the at least one antenna providing reception utilizing both a beamforming technique and an omnidirectional technique,
wherein the controller is programmed to cooperate with the at least one transmitter, the at least one receiver, and the at least one antenna to:
   schedule the inbound message to be transmitted at a first scheduled time on a channel from the portable subscriber unit;
   monitor the channel at the first scheduled time to receive the inbound message, utilizing the beamforming technique;
   reschedule the inbound message to be transmitted at a second scheduled time, in response to failing to achieve adequate reception of the inbound message at the first scheduled time;
   increase the time/frequency reuse distance during the second scheduled time; and
   remonitor the channel at the second scheduled time to receive the inbound message, utilizing the omnidirectional technique.

7. The fixed portion of claim 6, wherein the controller is further programmed to monitor the channel at the first scheduled time to receive the inbound message, utilizing both the beamforming technique and the omnidirectional technique.

8. The fixed portion of claim 6, wherein the controller is further programmed to monitor the channel at a predetermined time to receive an unscheduled inbound message, utilizing both the beamforming technique and the omnidirectional technique.

9. The fixed portion of claim 6, wherein the controller is further programmed to increase the time/frequency reuse distance for unscheduled inbound messages, in response to detecting an attempt by one of the plurality of portable subscriber units to transmit at least one unscheduled inbound message and failing to achieve adequate reception thereof by the at least one receiver.

10. The fixed portion of claim 9, wherein to increase the time/frequency reuse distance during the second scheduled time the controller is further programmed to take at least one of the following actions:
   command the plurality of portable subscriber units to suppress subzone registration;
   change a frequency reuse plan for unscheduled inbound messages;
   assign more time slots for unscheduled inbound message transmission; and
   command the plurality of portable subscriber units to wait longer between unscheduled inbound message retries.

11. A controller in a two-way radio messaging system for adjusting inbound transmission reliability, the radio messaging system employing a time/frequency reuse distance among a plurality of portable subscriber units, the radio messaging system having at least one transmitter coupled to the controller for transmitting an outbound message, at least one receiver coupled to the controller for receiving an inbound message from a portable subscriber unit, and at least one antenna coupled to the at least one receiver for providing reception utilizing both a beamforming technique and an omnidirectional technique, wherein the controller comprises:
   a processing system for directing operation of the controller;
   a network interface coupled to the processing system for receiving a message from a message source;
   a memory coupled to the processing system for storing the message and for storing software used in programming the processing system; and
   a transceiver interface coupled to the at least one transmitter and to the at least one receiver for control thereof and communication therewith,
wherein the processing system is programmed to cooperate with the at least one transmitter, the at least one receiver, and the at least one antenna to:
   schedule the inbound message to be transmitted at a first scheduled time on a channel from the portable subscriber unit;
   monitor the channel at the first scheduled time to receive the inbound message, utilizing the beamforming technique;
   reschedule the inbound message to be transmitted at a second scheduled time, in response to failing to achieve adequate reception of the inbound message at the first scheduled time; and
   remonitor the channel at the second scheduled time to receive the inbound message, utilizing the omnidirectional technique.

12. The controller of claim 11, wherein the processing system is further programmed to increase the time/frequency reuse distance during the second scheduled time.

13. The controller of claim 11, wherein the processing system is further programmed to monitor the channel at the first scheduled time to receive the inbound message, utilizing both the beamforming technique and the omnidirectional technique.

14. The controller of claim 11, wherein the processing system is further programmed to monitor the channel at a predetermined time to receive an unscheduled inbound message, utilizing both the beamforming technique and the omnidirectional technique.

15. The controller of claim 11, wherein the processing system is further programmed to increase the time/frequency reuse distance for unscheduled inbound messages, in response to detecting an attempt by one of the plurality of portable subscriber units to transmit at least one unscheduled inbound message and failing to achieve adequate reception thereof by the at least one receiver.

16. The controller of claim 15, wherein to increase the time/frequency reuse distance during the second scheduled time the processing system is further programmed to take at least one of the following actions:

command the plurality of portable subscriber units to suppress subzone registration;

change a frequency reuse plan for unscheduled inbound messages;

assign more time slots for unscheduled inbound message transmission; and command the plurality of portable subscriber units to wait longer between unscheduled inbound message retries.

* * * * *